United States Patent
Komura et al.

(10) Patent No.: US 8,169,861 B1
(45) Date of Patent: May 1, 2012

(54) THERMALLY-ASSISTED MAGNETIC RECORDING HEAD COMPRISING PLASMON GENERATOR

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 18 days.

(21) Appl. No.: 12/946,103

(22) Filed: Nov. 15, 2010

(51) Int. Cl.
*G11B 11/00* (2006.01)
(52) U.S. Cl. .............................. 369/13.33; 369/112.27
(58) Field of Classification Search ............... 369/13.33, 369/13.32, 13.24, 13.14, 13.03, 13.02, 13.12, 369/112.27, 112.09, 112.14, 112.21; 360/59, 360/313, 245.3, 126, 123.17, 125.31, 128, 360/125.74
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,330,404 B2 | 2/2008 | Peng et al. | |
| 7,454,095 B2 | 11/2008 | Baehr-Jones et al. | |
| 2008/0198496 A1 | 8/2008 | Shimazawa et al. | |
| 2010/0103553 A1 | 4/2010 | Shimazawa et al. | |
| 2011/0235478 A1* | 9/2011 | Komura et al. | 369/13.24 |

FOREIGN PATENT DOCUMENTS

JP 2008-257819 10/2008

OTHER PUBLICATIONS

Integrated plasmon and dielectric waveguides, Michael Hochberg, et al., Optics Express vol. 12, No. 22, Nov. 2004, pp. 5481-5486.
U.S. Appl. No. 12/848,422, filed Aug. 2, 2010 for Eiji Komura, et al.
U.S. Appl. No. 12/557,078, filed Sep. 10, 2009 for Daisuke Miyauchi, et al.

* cited by examiner

*Primary Examiner* — Ali Neyzari
(74) *Attorney, Agent, or Firm* — Frommer Lawrence & Haug LLP

(57) ABSTRACT

Provided is a thermally-assisted magnetic recording head in which NF-light with sufficiently high light density can be applied to a medium while a write-field generating point and a near-field light (NF-light) generating point are close to each other. The head comprises a plasmon generator provided between a magnetic pole and a waveguide and configured to be coupled with light propagating through the waveguide in a surface plasmon mode to emit NF-light. The plasmon generator comprises: a plasmon propagating part comprising a propagation edge for propagating surface plasmon excited by the light; and a light penetration suppressing part with an extinction coefficient greater than the plasmon propagating part. The light penetration suppressing part is in surface-contact with a surface portion of the plasmon propagating part excluding the propagation edge, and the magnetic pole is in surface-contact with the light penetration suppressing part. This configuration can avoid significant reduction in light use efficiency of an optical system generating NF-light due to partial absorption of electromagnetic field (light) into the magnetic pole.

18 Claims, 9 Drawing Sheets

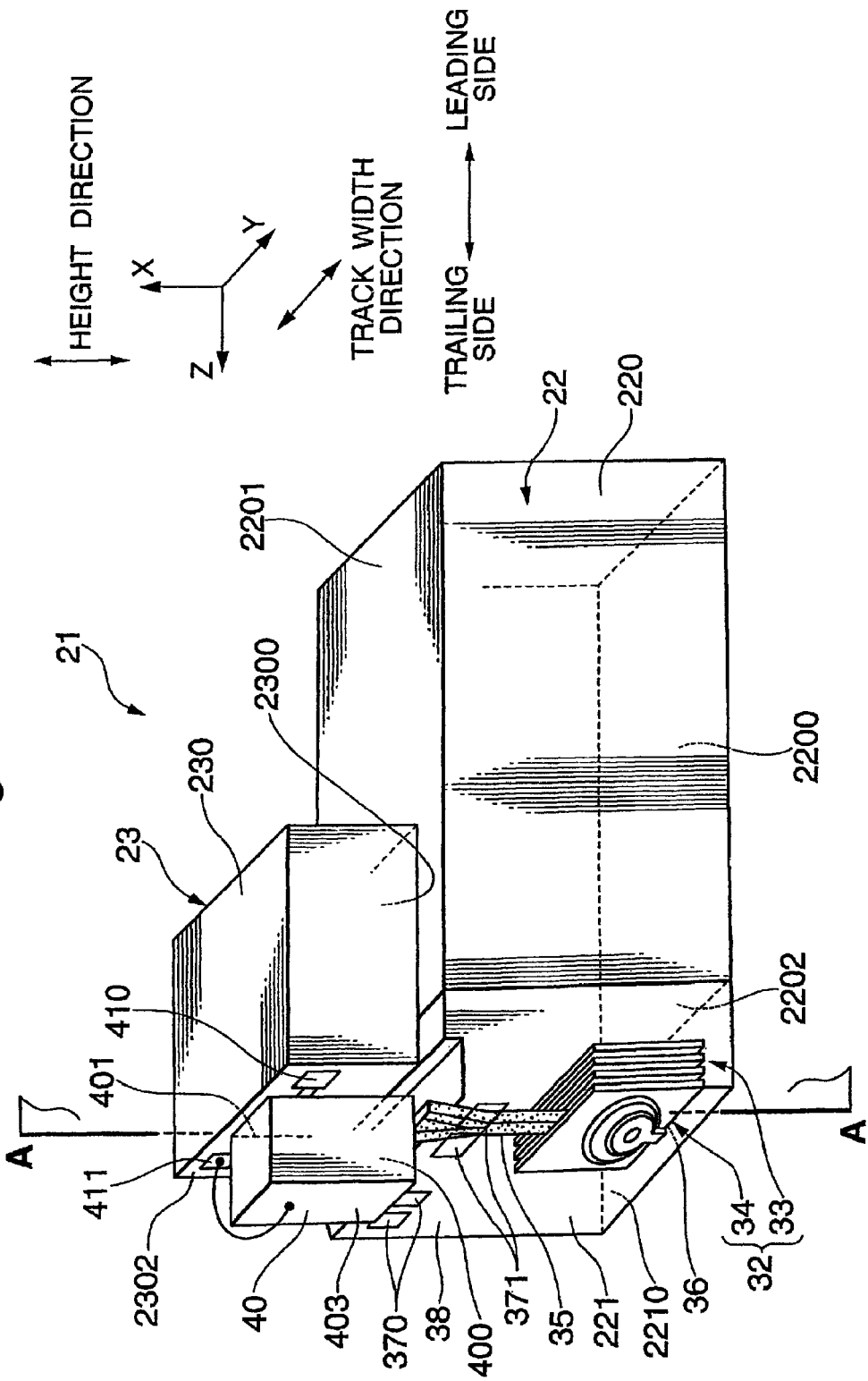

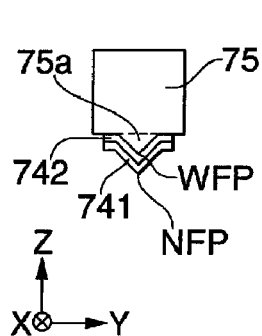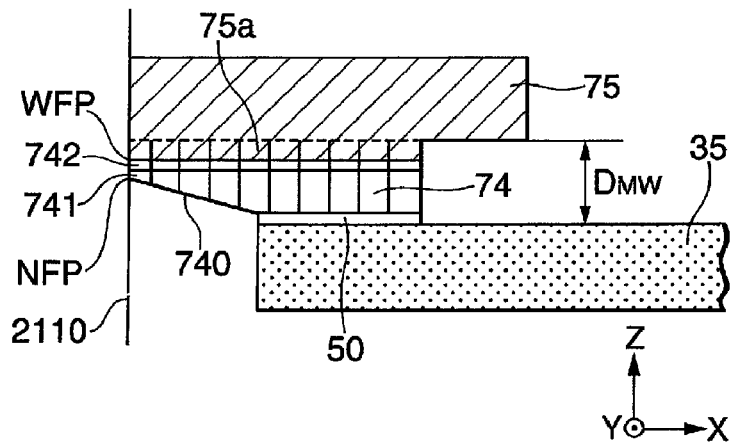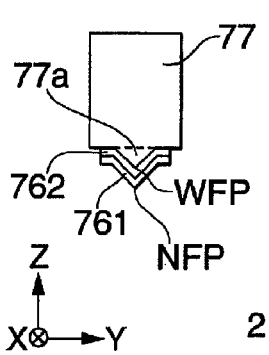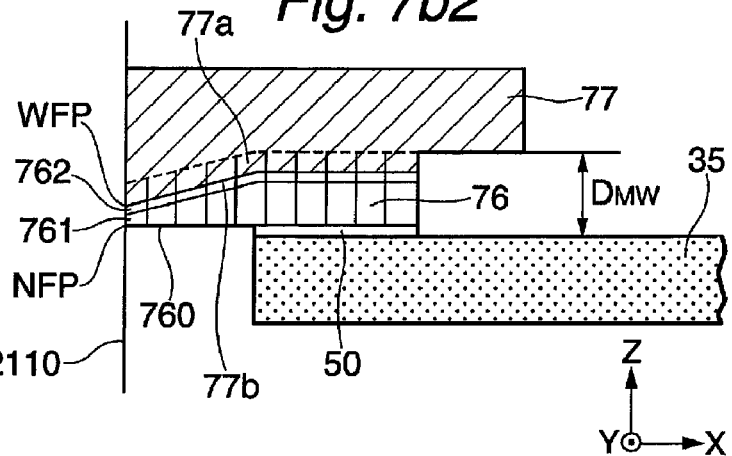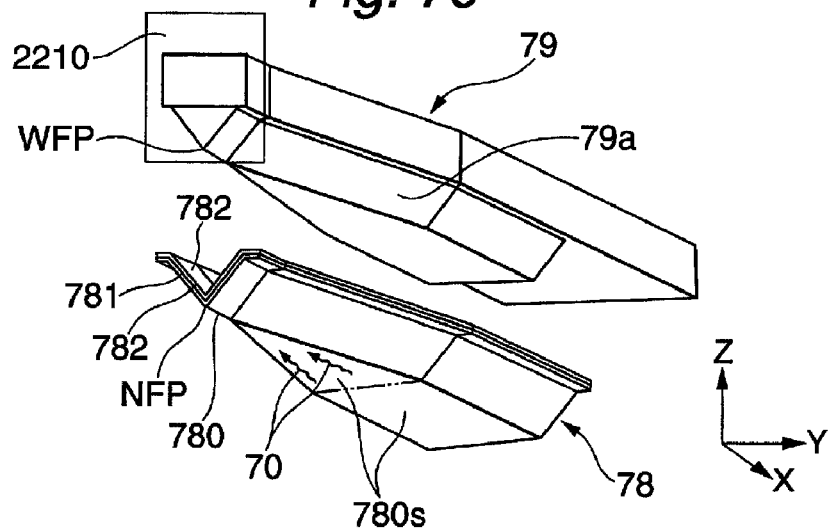

THERMALLY-ASSISTED MAGNETIC RECORDING HEAD COMPRISING PLASMON GENERATOR

BACKGROUND OF THE INVENTION

1. Field of the Invention

The present invention relates to a head used for thermally-assisted magnetic recording in which a magnetic recording medium is irradiated with near-field light (NF-light), thereby anisotropic magnetic field of the medium is lowered, thus data can be written. The present invention especially relates to a thermally-assisted magnetic recording head provided with a plasmon generator that converts light received from a waveguide into NF-light. Further, the present invention relates to a magnetic recording apparatus provided with the head.

2. Description of the Related Art

With the explosion in the use of the Internet in these years, a huge amount of data that are incommensurably larger than ever are stored and used on servers, information processing terminals, home electric appliances and so on. This trend is expected to further grow at an accelerated rate. Under these circumstances, demand for magnetic recording apparatuses such as magnetic disk apparatuses as mass storage is growing, and the demand for higher recording densities of the magnetic recording apparatuses is also escalating.

In the magnetic recording technology, it is necessary for magnetic heads to write smaller recording bits on magnetic recording media in order to achieve higher recording densities. In order to stably form smaller recording bits, perpendicular magnetic recording technology has been commercially implemented in which components of magnetization perpendicular to the surface of a medium are used as recording bits. In addition, thermally-assisted magnetic recording technology that enables the use of magnetic recording media having higher thermal stability of magnetization is being actively developed.

In the thermally-assisted magnetic recording technology, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write magnetic field (write field) to the heated portion. Generally proposed is a method in which the magnetic recording medium is irradiated and heated with near-field light (NF-light). The spot of the NF-light is set to be minute; the very small spot size can be realized which is free of diffraction limit. For example, U.S. Pat. No. 6,768,556 and U.S. Pat. No. 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with elements that generate NF-light have been proposed. Meanwhile, the present inventors have devised a technique in which laser light is coupled with a plasmon generator in a surface plasmon mode and excited surface plasmon is propagated to an opposed-to-medium surface, thereby providing NF-light, instead of directly applying the laser light to an element that generates NF-light. In the plasmon generator, its temperature does not excessively rise because light (waveguide light) that propagates through a waveguide is not directly applied to the plasmon generator. As a result, there can be avoided a situation in which the end of a read head element, which reaches the opposed-to-medium surface, becomes relatively far apart from the magnetic recording medium due to the thermal expansion of the generator, which makes it difficult to properly read servo signals during recording operations. In addition, there can also be avoided a situation in which the light use efficiency of an optical system for generating NF-light including the waveguide and the generator is degraded because thermal fluctuation of free electrons increases in the generator. Here, the light use efficiency is given by $I_{OUT}/I_{IN}(\times 100)$, where $I_{IN}$ is the intensity of laser light incident to the waveguide, and $I_{OUT}$ is the intensity of NF-light emitted from a NF-light generating end of the generator.

When an optical system including a plasmon generator such as the one described above is used to perform thermally-assisted magnetic recording in practice, an end surface of the plasmon generator and an end surface of a magnetic pole that generates write magnetic field need to be provided as close to each other as possible at an opposed-to-medium surface. More specifically, the distance between a NF-light generating location on the end surface of the plasmon generator and the write field generating location on the end surface of the magnetic pole needs to be sufficiently small. When the requirements described above are satisfied, the gradient of write field generated from the magnetic pole at the location on a magnetic recording medium that are irradiated with the NF-light can be sufficiently large and thereby thermally-assisted magnetic recording with high recording density can be achieved.

However, in general, in the presence of a metal close to the plasmon generator, some amount of surface plasmon propagating along the plasmon generator is partially absorbed in the metal. To avoid significant reduction in the light use efficiency of the optical system that generates NF-light due to absorption of surface plasmon into the magnetic pole made of magnetic metal, the plasmon generator and the magnetic pole need to be located at a sufficient distance from each other. This requirement conflicts with the requirement that the distance between the NF-light generating location and the write-field generating location be sufficiently small. To resolve the conflict, appropriate configurations and locations of the plasmon generator and the magnetic pole are critically important. It is also essential to appropriately control the location of NF-light generation on the end surface of the plasmon generator.

It can be understood that, for proper thermally-assisted magnetic recording, it is a critical issue to sufficiently reduce the distance between the NF-light generating location on the plasmon generator and the write field generating location on the magnetic pole while suppressing absorption of surface plasmon propagating along the plasmon generator.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (—X direction), out of all the end surfaces surrounding the waveguide. According to the definition, an "upper surface" and a "lower surface" are one of the "side surfaces". The "side surface" is a surface on which the propagating light can be totally reflected in the waveguide that corresponds to a core.

According to the present invention, a thermally-assisted magnetic recording head is provided, which comprises:

a magnetic pole for generating write field from its end on an opposed-to-medium surface side;

a waveguide through which a light for exciting surface plasmon propagates; and a plasmon generator provided between the magnetic pole and the waveguide, configured to be coupled with the light in a surface plasmon mode and to emit near-field light (NF-light) from a NF-light generating end surface positioned on the opposed-to-medium surface side.

Here, the plasmon generator comprises: a plasmon propagating part comprising a propagation edge extending to the NF-light generating end surface and configured to propagate thereon the surface plasmon excited by the light, at least a portion of the propagation edge being opposed to the waveguide with a predetermined distance; and a light penetration suppressing part formed of a material having an extinction coefficient greater than an extinction coefficient of a material that forms the plasmon propagating part.

Further, the light penetration suppressing part is in surface-contact with a surface portion of the plasmon propagating part, the surface portion excluding the propagation edge, and the magnetic pole is in surface-contact with the light penetration suppressing part.

In the above-described thermally-assisted magnetic recording head, a plasmon generator including a light penetration suppressing part is used and a magnetic pole is placed in contact with the plasmon generator in such a manner that the magnetic pole is in surface-contact with the light penetration suppressing part. This configuration using the light penetration suppressing part can avoid significant reduction in the light use efficiency of an optical system generating NF-light due to partial absorption of electromagnetic field (light) propagating along the plasmon generator into the magnetic pole. Furthermore, in the thermally-assisted magnetic recording head according to the present invention, the write field generating point WFP of the magnetic pole and the NF-light generating point NFP of the plasmon generator can be located close to each other and NF-light with a sufficiently high light density can be applied to a magnetic recording medium. As a result, thermally-assisted magnetic recording with a higher recording density can be achieved.

Furthermore, in the thermally-assisted magnetic recording head according to the present invention, the magnetic pole is preferably separated from the plasmon propagating part with the light penetration suppressing part sandwiched therebetween, and the light penetration suppressing part preferably covers a back surface of the plasmon propagating part, the back surface being on a side opposite to a propagation surface that includes the propagation edge. Further, the light penetration suppressing part is formed of a material selected from a group consisting of Al (aluminum), Mg (magnesium), In (indium), and Sn (tin), or is formed of an alloy containing at least one element selected from the group. Furthermore, it is preferable that: the magnetic pole comprises a protrusion that protrudes toward the waveguide; the plasmon propagating part covers at least a portion on the opposed-to-medium surface side of a magnetic pole edge, which is a protruding end of the protrusion, with the light penetration suppressing part sandwiched therebetween; and an end on the opposed-to-medium surface side of the magnetic pole edge, which is a write field generating location, is close to an end on the opposed-to-medium surface side of the propagation edge, which is a NF-light generating location.

Further, in the thermally-assisted magnetic recording head according to the present invention, a distance between the end on the opposed-to-medium surface side of the magnetic pole edge and the end on the opposed-to-medium surface side of the propagation edge is 15 nm (nanometers) or more, and 100 nm or less. The light penetration suppressing part preferably has a thickness of 1 nm or more and of 24 nm or less. The plasmon propagating part preferably has a thickness of 11 nm or more and of 99 nm or less.

Furthermore, in the thermally-assisted magnetic recording head according to the present invention, a magnetic shield is preferably provided on a side opposite to the magnetic pole when viewed from the plasmon generator. Further, it is preferable that a buffering portion having a refractive index lower than a refractive index of the waveguide is provided in a region including a portion sandwiched between the waveguide and the propagation edge.

According to the present invention, a head gimbal assembly (HGA) is further provided, which comprises the above-described thermally-assisted magnetic recording head and a suspension supporting the thermally-assisted magnetic recording head.

According to the present invention, a magnetic recording apparatus is furthermore provided, which comprises: at least one HGA described above; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 2 shows a perspective view illustrating an embodiment of thermally-assisted the magnetic recording head according to the present invention;

FIGS. 7a1 to 7c show schematic views illustrating different embodiments of an optical system that generates NF-light and a main magnetic pole according to the present invention;

DESCRIPTION OF THE PREFERRED EMBODIMENTS

Figure 1A:
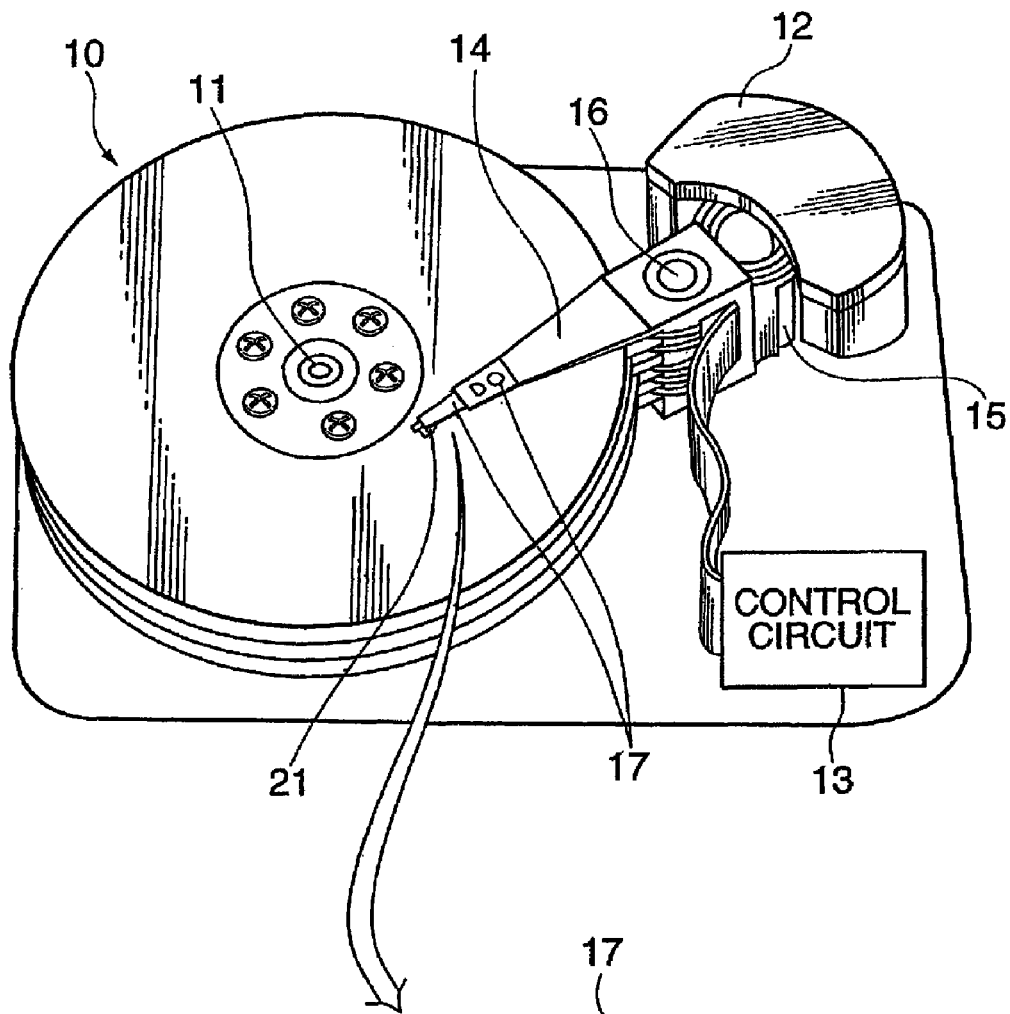
FIG. 1a shows a perspective view schematically illustrating an embodiment of a magnetic recording apparatus according to the present invention.
Figure 1B:
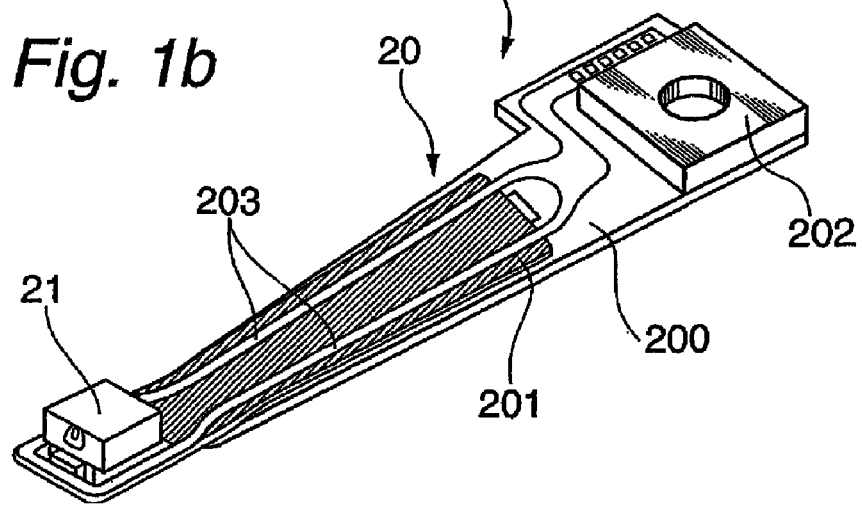
FIG. 1b shows a perspective view schematically illustrating an embodiment of a head gimbal assembly (HGA) according to the present invention.

FIG. 1a shows a perspective view schematically illustrating an embodiment of a magnetic recording apparatus according to the present invention. FIG. 1b shows a perspective view schematically illustrating an embodiment of a head gimbal assembly (HGA) according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1a includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring to FIG. 1b, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

FIG. 2 shows a perspective view illustrating an embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 fointed of, for example, a ceramic material such as AlTiC (Al$_2$O$_3$—TiC) or silicon oxide (SiO$_2$), and having an air bearing surface (ABS) 2200 processed so as to provide an appropriate flying height; and a head element part 221 formed on an element-formation surface 2202 perpendicular to and adjacent to the ABS 2200. While, the light source unit 23 includes: a unit substrate 230 formed of, for example, a ceramic or semiconductor material such as AlTiC (Al$_2$O$_3$—TiC), Si, GaAs or SiC, and having an joining surface 2300; and a laser diode 40 as a light source provided on a source-installation surface 2302 perpendicular to and adjacent to the joining surface 2300. The slider 22 and the light source unit 23 are bonded to each other by using, for example, a solder in such a way that the back surface 2201 of the slider substrate 220 and the joining surface 2300 of the unit substrate 230 are joined to each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head element part 221 formed on the element-formation surface 2202 of the slider substrate 220 includes: a head element 32 constituted of a magnetoresistive (MR) element 33 for reading data from a magnetic disk and an electromagnetic transducer 34 for writing data to the magnetic disk; a waveguide 35 for guiding laser light generated from a laser diode 40 provided in the light source unit 23 to the opposed-to-medium surface side; a plasmon generator 36, the generator 36 and the waveguide 35 constituting an optical system that generates near-field light (NF-light); an overcoat layer 38 formed on the element-formation surface 2202 in such a way as to cover the MR element 33, the electromagnetic transducer 34, the waveguide 35, and the plasmon generator 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1b).

One ends of the MR element 33, the electromagnetic transducer 34 and the plasmon generator 36 reach a head end surface 2210, which is an opposed-to-medium surface of the head part 221. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk 10 (FIG. 1a) with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the plasmon generator 36 in a surface plasmon mode, and causes surface plasmon to be excited on the plasmon generator 36. The surface plasmon propagates on a propagation edge provided in the plasmon generator 36, which will be explained later, toward the head end surface 2210, which causes NF-light to be generated from the end of the plasmon generator 36 on the head end surface 2210 side. The generated NF-light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field generated from the electromagnetic transducer 34 to the portion with decreased anisotropic magnetic field.

Figure 3:
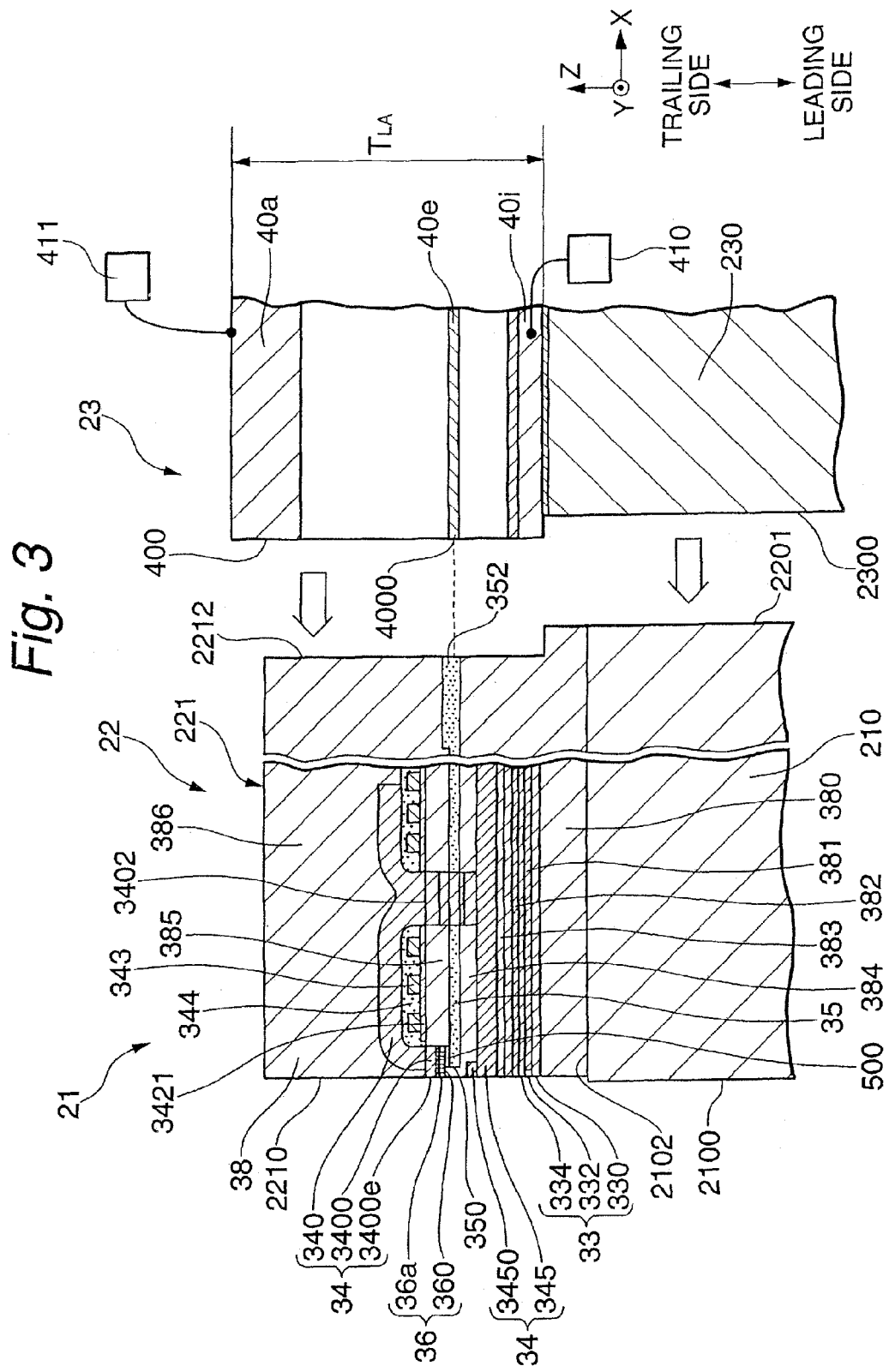
FIG. 3 shows a cross-sectional view taken by plane A in FIG. 2, schematically illustrating the structure of a main part of the thermally-assisted magnetic recording head.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 5:
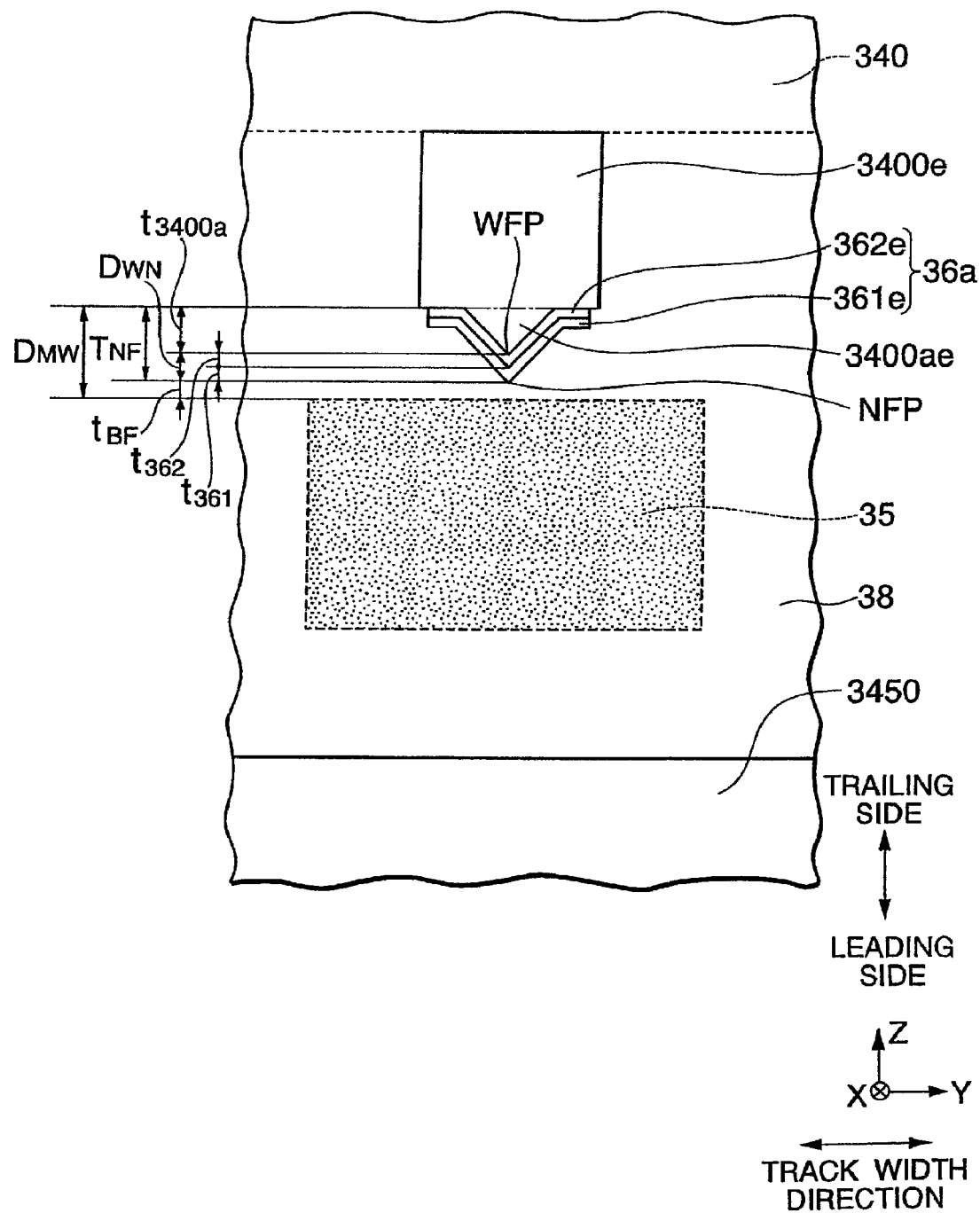
FIG. 5 shows a plan view illustrating the shapes of the end surfaces of the waveguide, the plasmon generator and the electromagnetic transducer on the head end surface or in its vicinity.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head end surface 2210, and the end surface 3400e of the pole 3400, which is a portion of the end surface 2210, has a vertex closest to the lower shield 3450 (most on the leading side), the vertex being a point (WFP: FIG. 5) where write field is generated. This minute write-field-generating point of the main magnetic pole 3400 enables a fine write field responding to higher recording density to be generated. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole is, for example, in the range of approximately 0.1 to 0.8 μm (micrometer).

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10 (FIG. 1a). The lower yoke layer 345 is formed of a soft-magnetic material, and its thickness is, for example, approximately 0.5 to 5 μm. Further, the lower shield 3450 is a magnetic shield that reaches the head end surface 2210, being magnetically connected with the lower yoke layer 345. The lower shield 3450 is provided on the opposite side to the main magnetic pole 3400 when viewed from the plasmon generator 36 and is opposed to the main magnetic pole 3400 through the plasmon generator 36, and acts for receiving the magnetic flux spreading from the main magnetic pole 3400. The lower shield 3450 is preferably formed of a material with high saturation magnetic flux density such as NiFe (Permalloy) or an iron alloy as the main magnetic pole 3400 is formed of.

Referring also to FIG. 3, the waveguide 35 and the plasmon generator 36 are provided between the lower yoke layer 345 (lower shield 3450) and an upper yoke layer 340 (main magnetic pole 3400), and form an optical system for generating NF-light in the head element part 221. The waveguide 35 is provided in parallel with an element-formation surface 2202 and extends from the rear end surface 352 which is a portion of the head rear end surface 2212 to the end surface 350 on the head end surface 2210 side. A portion of the upper surface (side surface) of the waveguide 35 and a portion of the lower surface (including a propagation edge 360) of the plasmon generator 36 are opposed to each other with a predetermined distance therebetween. An insulating-layer portion sandwiched between these portions forms a buffering portion 50 that has a refractive index lower than that of the waveguide 35. The buffering portion 50 couples laser light propagating through the waveguide 35 to the plasmon generator 36 in a surface plasmon mode.

The plasmon generator 36 is located between a waveguide 35 and a main magnetic pole 3400. The plasmon generator 36 includes a NF-light generating end surface 36a which forms a part of the head end surface 2210. The plasmon generator 36 also includes a two-layered structure made up of a plasmon propagating part 361 (FIG. 4) and a light penetration suppressing part 362 (FIG. 4), which will be described later in detail with reference to FIG. 4. The plasmon propagating part 361 (FIG. 4) includes a propagation edge 360 at least a portion of which faces the waveguide 35 with a buffer portion 50 between them. The propagation edge 360 extends to the NF-light generating end surface 36a and propagates surface plasmon excited by laser light (waveguide light) that has traveled through the waveguide 35. The plasmon generator 36 couples with the waveguide light in a surface plasmon mode and propagates the surface plasmon along the propagation edge 360 to generate NF-light from the NF-light generating end surface 36a. On the other hand, the light penetration suppressing part 362 (FIG. 4) is made of a material having an extinction coefficient $k_{362}$ greater than the extinction coefficient $k_{361}$ of the material of the plasmon propagating part 361 and is in surface-contact with a surface portion of the plasmon propagating part 361, the surface portion excluding the propagation edge 360.

The main magnetic pole 3400 is in contact with the plasmon generator 36 in such a manner that the main magnetic pole 3400 is in surface-contact with the light penetration suppressing part 362. In other words, the main magnetic pole 3400 and the plasmon propagating part 361 are separated from each other with the light penetration suppressing part 362 sandwiched therebetween. Provision of the light penetration suppressing part 362 in this relation to the main magnetic pole 3400 can avoid significant reduction in light use efficiency of the optical system generating NF-light due to partial absorption of surface plasmon propagating along the propagation edge 360 into the main magnetic pole 3400 made of a magnetic metal. Configuration of the waveguide 35, the plasmon generator 36 including the plasmon propagating part 361 and the light penetration suppressing part 362, and the main magnetic pole 3400 will be described later in detail with reference to FIGS. 4 to 6.

Also according to FIG. 3, the light source unit 23 includes: a laser diode 40 provided on the source-installation surface 2302 of a unit substrate 230; a terminal electrode 410 electrically connected to a lower electrode 40i as a lower surface of the laser diode 40; and a terminal electrode 411 electrically connected to an upper electrode 40a as an upper surface of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the plasmon generator 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm (nanometers) to 1.7 μm. The laser diode 40 has a multilayered structure including an upper (n-type) electrode 40a, an active layer 40e, and a lower (p-type) electrode 40i. On the front and rear cleaved surfaces of the multilayered structure of the laser diode 40, respectively formed are reflective layers for exciting the oscillation by total reflection. Here, the laser diode 40 has a thickness $T_{LA}$ in the range of, for example, approximately 60 to 200 μm.

Further, an electric source provided within the magnetic disk apparatus can be used for driving the laser diode 40. In fact, the magnetic disk apparatus usually has an electric source with applying voltage of, for example, approximately 2 to 5V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, and may have a size, for example, in which the width in the track width direction is 425 μm; the length is 300 μm; and the thickness is 300 μm.

By joining the above-described light source unit 23 and slider 22, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
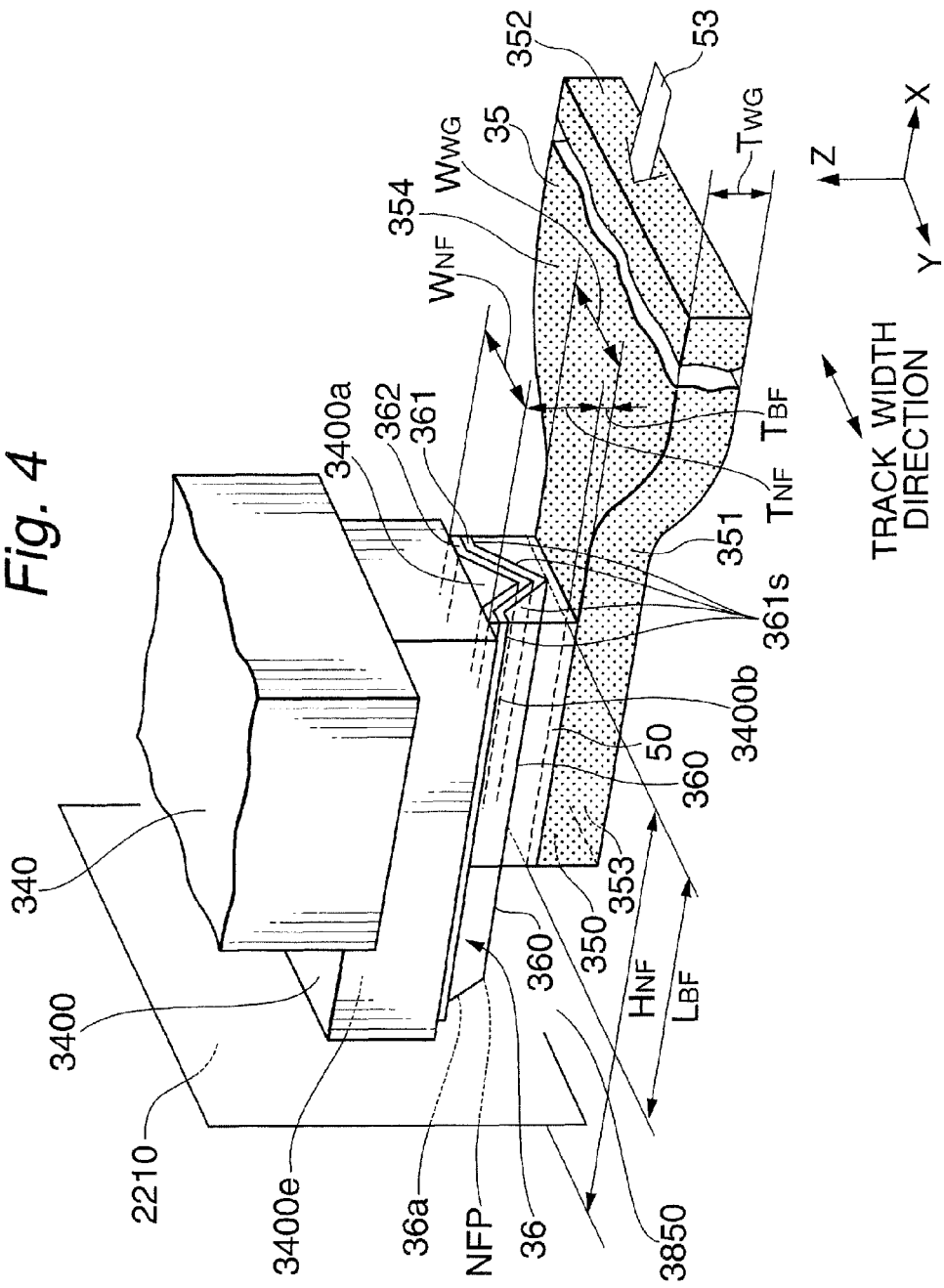
FIG. 4 shows a perspective view schematically illustrating the configuration of the waveguide, the plasmon generator and the main magnetic pole.

FIG. 4 shows a perspective view schematically illustrating the configuration of the waveguide 35, the plasmon generator 36 and the main magnetic pole 3400. In the figure, the head end surface 2210 is positioned at the left side, the end surface 2210 including positions where write field and NF-light are emitted toward the magnetic recording medium.

Referring to FIG. 4, there are provided a waveguide 35 that propagates laser light 53 for generating NF-light and a plasmon generator 36 that couples with laser light (waveguide light) 53 in a surface plasmon mode and generates NF-light used for thermal assist from a NF-light generating end surface 36a provided on the head end surface 2210 side.

The plasmon generator 36 includes a two-layered structure made up of a plasmon propagating part 361 and a light penetration suppressing part 362. The plasmon propagating part 361 includes a propagation edge 360 at least a part of which faces the waveguide 35 with a buffer 50 sandwiched therebetween. The propagation edge 360 extends to a NF-light generating end surface 36a, and propagates surface plasmon excited by laser light (waveguide light) 53 to the NF-light generating end surface 36a. The light penetration suppressing part 362, on the other hand, is made of a material having an extinction coefficient $k_{362}$ greater than the extinction coefficient $k_{361}$ of the material of the plasmon propagating part 361 and is in surface-contact with a portion of the surface of the plasmon propagating part 361, the surface portion excluding the propagation edge 360. That is, the light penetration suppressing part 362 covers the back surface that is opposite to a propagation surface 361s of the plasmon propagating part 361 including the propagation edge 360.

A main magnetic pole 3400 is in contact with the plasmon generator 36 in such a manner that the main magnetic pole 3400 is in surface-contact with the light penetration suppressing part 362. In other words, the main magnetic pole 3400 and the plasmon propagating part 361 are separated from each other with the light penetration suppressing part 362 sandwiched therebetween. The main magnetic pole 3400 has a protrusion 3400a protruding toward the waveguide 35. The plasmon propagating part 361 covers at least a portion on the head end surface 2210 side of a magnetic pole edge 3400b, which is the protruding end of the protrusion 3400a, with the light penetration suppressing part 362 sandwiched therebetween. The extinction coefficient $k_{362}$ of the light penetration suppressing part 362 is greater than the extinction coefficient $k_{361}$ of the plasmon propagating part 361 as stated above. Accordingly, light (electromagnetic field) propagating in the plasmon propagating part 361 and attempting to travel through the light penetration suppressing part 362 toward the main magnetic pole 3400 can hardly enter the light penetration suppressing part 362 due to a higher skin effect. Consequently, the light penetration suppressing part 362 provided between the plasmon propagating part 361 and the main magnetic pole 3400 as described above can avoid significant reduction in the light use efficiency of the optical system generating near-filed light due to partial absorption of surface plasmon (electromagnetic field) propagating along the propagation edge 360 into the main magnetic pole 3400 made of a magnetic metal.

With continued reference to FIG. 4, in the plasmon generator 36, only the light penetration suppressing part 362 is in contact with the main magnetic pole 3400 as described above. Accordingly, the propagation edge 360 of the plasmon propagating part 361, which is on the opposite side to the light penetration suppressing part 362, is reliably separated from the main magnetic pole 3400. Therefore, surface plasmon excited are hardly absorbed in the main magnetic pole 3400 and can concentrate on and propagate along the propagation edge 360. As a result, surface plasmon reliably reaches the vertex (NFP in FIG. 5) that is one vertex of the NF-light generating end surface 36a and is an end of the propagation edge 360. Thus the vertex NFP becomes the NF-light generating point of the plasmon generator 36. The corner of the propagation edge 360 is rounded in order to prevent surface plasmon from deflecting from the propagation edge 360 to reduce the light use efficiency. It is known that the radius of curvature of the rounded corner in the range of 6.25 to 20 nm is preferable.

As also shown in FIG. 4, the plasmon generator 36 is in surface contact with the main magnetic pole 3400. Accordingly, heat generated from the plasmon generator 36 when generating NF-light can be partially dissipated into the main magnetic pole 3400. That is, the main magnetic pole 3400 can be used as a heatsink. As a result, excessive rise of temperature of the plasmon generator 36 can be suppressed, and an unnecessary protrusion of the NF-light generating end surface 36a and a substantial reduction in light use efficiency in the plasmon generator 36 can be avoided. Furthermore, the plasmon propagating part 361 and the light penetration suppressing part 362 of the plasmon generator 36 can be formed of a metal. Therefore, since the plasmon generator 36 is in contact with the main magnetic pole 3400 also made of a metal, the plasmon generator 36 is not electrically isolated and thus detrimental effects of electrostatic discharge (ESD) from the plasmon generator 36 can be inhibited.

A portion sandwiched between a portion of side surface (upper surface) 354 of the waveguide 35 and a portion of propagation surface (lower surface) 361s including the propagation edge 360 of the plasmon generator 36 forms a buffering portion 50. That is, the propagation edge 360 is covered with the buffering portion 50. The buffering portion 50 couples waveguide light 53 to the plasmon generator 36 in a surface plasmon mode. The propagation edge 360 propagates surface plasmon, which is excited by the waveguide light 53 via the buffering portion 50, to the NF-light generating end surface 36a. The term "side surfaces" of the waveguide 35 as used herein refers to the end surfaces 351, 353, and 354 among the surrounding end surfaces of the waveguide 35 except the end surface 350 on the head end surface 2210 side and the rear end surface 352 opposite to the end surface 350. The side surfaces of the waveguide 35 are capable of totally reflecting waveguide light 53 propagating through the waveguide 35 that acts as a core and the surrounding overcoat layer 38 (FIG. 2) that acts as a clad. The buffering portion 50 may be a portion of the overcoat layer 38, or may be a different layer provided in addition to the overcoat layer 38.

The plasmon propagating part 361 of the plasmon generator 36 is preferably made of Au (gold, which has an extinction coefficient k=4.9 at a light wavelength of 800 nm) which has a high NF-light generation efficiency, an alloy primarily containing Au, Ag (silver, which has an extinction coefficient k=5.2 at a light wavelength of 800 nm), or an alloy primarily containing Ag. On the other hand, the light penetration suppressing part 362 is preferably made of one material, which has an extinction coefficient $k_{362}$ greater than the extinction coefficient $k_{361}$ of the material of the plasmon propagating part 361, selected from the group consisting of Al (aluminum, which has an extinction coefficient k=8.1 at a light wavelength of 800 nm), Mg (magnesium, which has an extinction coefficient k=8.0 at a light wavelength of 800 nm), In (indium, which has an extinction coefficient k=6.6 at a light wavelength of 800 nm), and Sn (tin, which has an extinction coefficient k=7.3 at a light wavelength of 800 nm), or an alloy containing at least one element selected from the group. The light penetration suppressing part 362 preferably has an NF-light generation efficiency higher than the magnetic material of the main magnetic pole 3400. The width $W_{NF}$ in the track width direction (Y-axis direction) and the thickness $T_{NF}$ (in Z-axis direction) of the plasmon generator 36 are preferably smaller than the wavelength of laser light 53. The length (height) $H_{NF}$ (in X-axis direction) of the plasmon generator 36 may be in the range approximately from 0.5 to 6.0 μm, for example.

Further, the side surfaces of the waveguide 35: the upper surface 354; the lower surface 353; and both the side surfaces 351 in the track width direction (Y-axis direction) have a surface contact with the overcoat layer 38 (FIG. 2), that is, the insulating layers 384 and 385 (FIG. 3), except the portion having a surface contact with the buffering portion 50. Here, the waveguide 35 is formed of a dielectric material with a refractive index $n_{WG}$ higher than a refractive index $n_{OC}$ of the constituent material of the overcoat layer 38. For example, in the case that the wavelength of laser light is 600 nm and the overcoat layer 38 is formed of $Al_2O_3$ (n=1.63), the waveguide 35 can be formed of, for example, $SiO_xN_y$ (n=1.7-1.85), $TaO_x$ (n=2.16), $NbO_x$ (n=2.33), or $TiO_x$ (n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 can reach the position of the buffering portion 50, which improves the propagation efficiency of the waveguide 35. Meanwhile, in the present embodiment, a portion of propagation edge 360 that is not opposed to the waveguide 35 (buffering portion 50) may be covered with the constituent material of the overcoat layer 38 having refractive index $n_{OC}$, for example, with a portion 3850 of the insulating layer 385.

The waveguide 35 may have a shape with a constant width in the track width direction (Y-axis direction), or as shown in FIG. 4, may have a portion on the head end surface 2210 side, which has a narrower width in the track width direction (Y-axis direction). The width $W_{WG}$ in the track width direction (Y-axis direction) of a portion of the waveguide 35 on the head end surface 2210 side may be, for example, in the range approximately from 0.3 to 100 µm, and the thickness $T_{WG}$ (in Z-axis direction) may be, for example, in the range approximately from 0.1 to 4 µm.

The buffering portion 50 is formed of a dielectric material having a refractive index $n_{BF}$ lower than the refractive index $n_{WG}$ of the waveguide 35. For example, when the wavelength of laser light is 600 nm and the waveguide 35 is formed of $TaO_x$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ or $Al_2O_3$. Further, the length $L_{BF}$ (in X-axis direction) of a portion of the buffering portion 50, the portion being sandwiched between the side surface 354 of the waveguide 35 and the propagation edge 360, is preferably in the range of 0.5 to 5 µm, and is preferably larger than the wavelength of the laser light 53. In this preferable case, the coupled portion has an area markedly larger than a so-called "focal region" in the case that, for example, laser light is converged on a buffering portion 50 and a plasmon generator 36 and is coupled in a surface plasmon mode. As a result, very stable coupling in the surface plasmon mode can be achieved. The thickness $T_{BF}$ of the buffering portion 50 is preferably set to be, for example, in the range of 10 to 200 nm. The length $L_{BF}$ and the thickness $T_{BF}$ of the buffering portion 50 are important parameters for obtaining proper excitation and propagation of surface plasmon.

FIG. 5 shows a plan view illustrating the shapes of the end surfaces of the waveguide 35, the plasmon generator 36 and the electromagnetic transducer 34 on the head end surface 2210 or in its vicinity.

As shown in FIG. 5, in the electromagnetic transducer 34, the main magnetic pole 3400 and the lower shield 3450 reach the head end surface 2210. The end surface 3400e of the main magnetic pole 3400 on the head end surface 2210 has a combined shape of: a trailing-side portion having, for example, a substantially rectangular, square, or trapezoidal shape; and a end surface 3400ae of the protrusion 3400a that protrudes toward the waveguide 35. The vertex WFP most on the leading side in the end surface 3400e is closest to the lower shield 3450, and therefore magnetic field is most concentrated at the vertex WFP; thus the vertex WFP becomes a write-field generating point. Since the main magnetic pole 3400 has such a small write-field generating point, a minute write field that meets higher recording density can be generated.

The NF-light generating end surface 36a of the plasmon generator 36 at the head end surface 2210 is shaped like a letter V having a predetermined thickness and includes an end surface 361e of the plasmon propagating part 361 and end surface 362e of the light penetration suppressing part 362. An end surface 3400e of the main magnetic pole 3400 is in contact with the end surface 362e of the light penetration suppressing part 362. The end surface 3400e and the end surface 361e of the plasmon propagating part 361 are separated by the end surface 362e that is sandwiched therebetween.

The location of the end surface 362e of the light penetration suppressing part 362 separates the write field generating point WFP from the NF-light generating point NFP, which is the end of the propagation edge 360 on the head end surface 2210 side, by a distance equal to the thickness of the near-filed light generating end surface 36a in Z-axis direction (thickness $t_{361}$ of the end surface 361e of the plasmon propagating part 361 + thickness $t_{362}$ of the end surface 362e of the light penetration suppressing part 362). Accordingly, by controlling the thickness of the plasmon generator 36 to an appropriate small value, the write field generating point WFP and the NF-light generating point NFP can be located sufficiently close to each other while suppressing absorption of surface plasmon through the use of the light penetration suppressing part 362. As a result, the magnetic field gradient of write field generated from the main magnetic pole 3400 can be increased to a sufficient value in a position on the magnetic disk 10 that is irradiated with NF-light, and therefore thermally-assisted magnetic recording with high recording density can be performed.

It is known that a distance $D_{WN}$ (=$t_{361}$+$t_{362}$) between the points WFP and NFP is preferably 15 nm or more and preferably 100 nm or less, in order to provide a sufficiently high magnetic field gradient of write filed in a position on the magnetic recording layer of the magnetic disk 10 that is irradiated with NF-light to enable thermally-assisted magnetic recording with high recording density. The thickness $t_{362}$ of the light penetration suppressing part 362 in Z-axis direction is preferably 1 nm or more and preferably 24 nm or less, and the thickness $t_{361}$ of the plasmon propagating part 361 in Z-axis direction is preferably 11 nm or more and preferably 99 nm or less, as will be described with respect to practical examples.

Separation of the part of the main magnetic pole 3400 that is not protruding (the part of the main magnetic pole 3400 excluding the protrusion 3400a) and the waveguide 35 by an appropriate distance $D_{MW}$ can avoid reduction in the amount of light ultimately converted to NF-light due to absorption of part of waveguide light into the main magnetic pole 3400 made of metal and further absorption of part of NF-light in the magnetic pole. The relationship between the thicknesses and the distances $D_{WN}$ and D is $D_{MW}-t_{3400a}-D_{WN}-T_{BF}=0$, where $t_{3400a}$ is the thickness of the protrusion 3400a of the main magnetic pole 3400 in Z-axis direction and $T_{BF}$ is the distance between the near-filed light generating point NFP and the waveguide 35 in Z-axis direction, that is, the thickness of the buffer 50 (FIG. 4). The thickness $T_{BF}$ is set to a predetermined value in order to achieve appropriate excitation and propagation of surface plasmon.

As has been described above, in a thermally-assisted magnetic recording head according to the present invention, the distance $D_{WN}$ on the head end surface 2210 between the point NFP that applies heat during writing and the point WFP that writes data can be set to a sufficiently small value. Accordingly, write field that has a sufficiently high magnetic field gradient can be applied to a sufficiently heated portion of the magnetic recording layer of a magnetic disk. Consequently, considerably small recording bits that enable high recording density can be formed.

Figure 6:
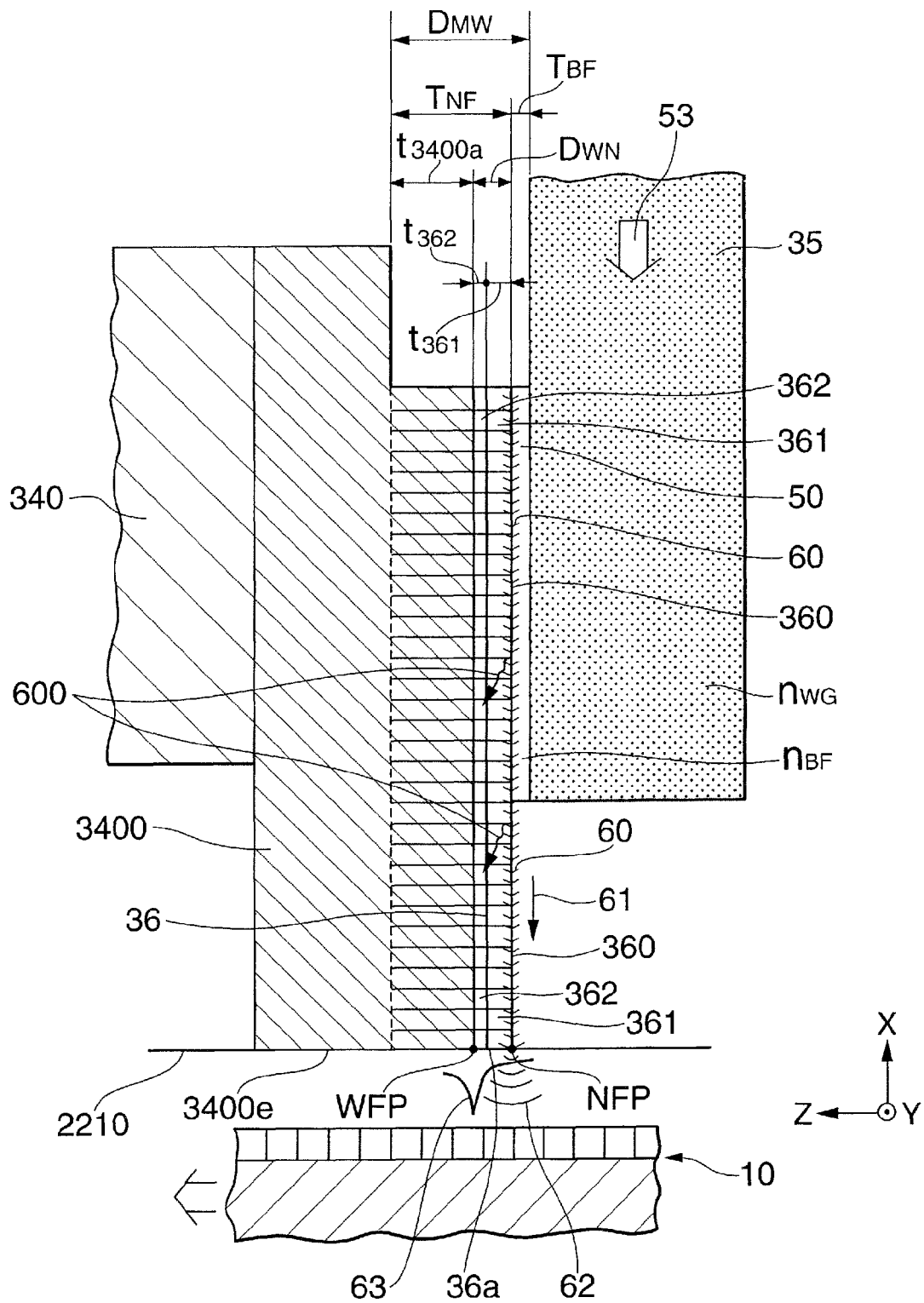
FIG. 6 shows a schematic view for explaining the thermally-assisted magnetic recording utilizing a surface plasmon mode according to the present invention.

FIG. 6 shows a schematic view for explaining the thermally-assisted magnetic recording utilizing a surface plasmon mode according to the present invention. The figure shows a case that the main magnetic pole 3400 is alternatively longer in X-axis direction than the plasmon generator 36. However, the principle of thermally-assisted magnetic recording explained below apples to the respective embodiments shown in FIG. 4 and FIG. 6.

Referring to FIG. 6, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the buffering portion 50, couples with the optical configuration including the waveguide 35 with a refractive index $n_{WG}$, the buffering portion 50 with a refractive index $n_{BF}$ and the plasmon generator 36 made of a conductive material such as a metal, and induces a surface plasmon mode on the propagation edge 360 of the plasmon generator 36. That is, the waveguide light couples with the plasmon generator 36 in a surface plasmon mode.

Actually, evanescent light is excited within the buffering portion 50 based on the optical boundary condition between the waveguide 35 as a core and the buffering portion 50. Then, the evanescent light couples with the fluctuation of electric charge excited on the metal surface (propagation edge 360) of the plasmon generator 36, and induces a surface plasmon mode, and thus surface plasmon is excited. To be exact, there excited is surface plasmon polariton in this system because surface plasmon as elementary excitation is coupled with an electromagnetic wave. However, the surface plasmon polariton will be hereinafter referred to as surface plasmon for short. The above-described surface plasmon mode can be induced by setting the refractive index $n_{BF}$ of the buffering portion 50 to be smaller than the refractive index $n_{WG}$ of the waveguide 35 ($N_{BF} < N_{WG}$) and by appropriately choosing: the length (in X-axis direction) of the buffering portion 50, that is, the length $L_{BF}$ of the coupling portion between the waveguide 35 and the plasmon generator 36; and the thickness $T_{BF}$ (in Z-axis direction) of the buffering portion 50.

The plasmon generator 36 has a two-layered structure made up of a plasmon propagating part 361 and a light penetration suppressing part 362. A propagation edge 360, which is an edge of the plasmon propagating part 361, is at a distance from the light penetration suppressing part 362 and is not in contact with a main magnetic pole 3400 at all. The propagation edge 360 in a propagation surface (lower surface) 361s of the plasmon propagating part 361 that faces the waveguide 35 is closest to the waveguide 35 and is a corner where electric field is more likely to concentrate. Accordingly, surface plasmon is most strongly excited on the propagation edge 360. The excited surface plasmon 60 propagates mainly along the propagation edge 360 in the direction indicated by arrow 61.

Since surface plasmon 60 propagates along the propagation edge 360 in the direction indicated by arrow 61, the surface plasmon 60, that is, an electric field, concentrate at the vertex NFP of the NF-light generating end surface 36a which reaches the head end surface 2210 and to which the propagation edge 360 extends. As a result, NF-light 62 is generated from the vertex NFP. The NF-light 62 is emitted toward the magnetic recording layer of the magnetic disk 10, reaches the surface of the magnetic disk 10, and heats a portion in the magnetic recording layer of the magnetic disk 10. In consequence, anisotropic magnetic field (coercivity) in the portion is reduced to a value that allows data to be written. Immediately after that, write field 63 generated from the vertex WFP of the end surface 3400e of the main magnetic pole 3400 is applied to the portion to write data. In this way, good thermally-assisted magnetic recording can be performed.

Here, a situation will be considered in which excited surface plasmon partially propagates toward the main magnetic pole 3400 as an electromagnetic field (light) 600. The electromagnetic field 600 attempts to enter the light penetration suppressing part 362 from the plasmon propagating part 361. However, the light penetration suppressing part 362 is made of a material that has an extinction coefficient $k_{362}$ greater than the extinction coefficient $k_{361}$ of the material of the plasmon propagating part 361 as described above. Therefore, the electromagnetic field 600 can hardly enter the light penetration suppressing part 362 due to a higher skin effect of the light penetration suppressing part 362. Accordingly, there can be avoided significant reduction in light use efficiency of the optical system generating NF-light due to partial absorption of surface plasmon propagating along the propagation edge 360 into the main magnetic pole 3400 made of a magnetic metal.

Here, the extinction coefficient k in general is the imaginary part of a complex index of refraction. In a theoretical formula of the electromagnetic field, the skin depth $\delta$ is proportional to the $-\frac{1}{2}$nd power of the extinction coefficient k:

$$\delta = 1/\omega \cdot (\mu \in_0 nk)^{-1/2}$$

Equation (1) can be derived as follows. An electromagnetic field with an angular frequency $\omega$ that propagates in a medium having an electrical conductivity $\sigma$ and a magnetic permeability $\mu$ in a z direction is obtained by solving Maxwell's equations as follows. When $\omega$ of the electric field component $E \exp(i\gamma z - i\omega t)$ of the electromagnetic field is well smaller than $\sigma/\in$ ($\omega \ll \sigma/\in$), the real part $\gamma_1$ and the imaginary part $\gamma_2$ of the $\gamma$ are both:

$$\gamma_1 = \gamma_2 = (\sigma \mu \omega / 2)^{-1/2} \tag{2}$$

It is known that generally the electrical conductivity $\sigma$ and the permittivity $\in$ are in the relationship $\sigma = \omega \in_0 \in_{img}$, where $\in_{img}$ is the imaginary part of the permittivity $\in$, which can be expressed as $\in_{img} = 2nk$ by the real part n and the imaginary part (extinction coefficient) k of the complex index of refraction. The relationships are substituted into Equation (2), and skin depth $\delta$ is defined as a penetration distance z over which the amplitude of the electric field component $E \exp(i\gamma z - i\omega t)$ is $1/e$ (an increase by a factor of approximately 0.37) to obtain Equation (1).

Therefore, if the plasmon propagating part 361 is made of Au (with an extinction coefficient k=4.9) and the light penetration suppressing part 362 is made of Al (with an extinction coefficient k=8.1) for light with a wavelength of 800 nm ($\omega = 3.8 \times 10^{14}$ Hz), the condition $\omega \ll \sigma/\in$ is adequately satisfied because the electrical conductivity $\sigma$ of Al is $9.12 \times 10^5$ $\Omega^{-1} m^{-1}$ and the permittivity $\in$ of Al is on the same order as the permittivity $\in_0$ in a vacuum ($8.85 \times 10^{-12}$ $Fm^{-1}$) as in typical metal. Consequently, the electromagnetic field (light) that attempts to travel into the light penetration suppressing part 362 from the plasmon propagating part 361 enters an environment in which the skin depth $\delta$ decreases to approximately 78% as will be apparent from Equation (1), and quickly attenuates. As a result, the electromagnetic field can hardly enter the light penetration suppressing part 362.

In contrast to the above-described case of generating NF-light utilizing a surface plasmon mode, in a conventional case in which a NF-light generator provided on the end surface of a head is directly irradiated with the laser light propagating through a waveguide, most of the irradiating laser light has been converted into thermal energy within the NF-light generator. In this case, the size of the NF-light generator has been set smaller than the wavelength of the laser light, and its volume is very small. Therefore, the NF-light generator has been brought to a very high temperature, for example, 500° C. (degrees Celsius) due to the thermal energy. As a result, there has been a problem that the end of a read head element, which reaches the opposed-to-medium surface, becomes relatively far apart from the magnetic disk due to the thermal expansion of the generator, which makes it difficult to properly read servo signals during recording operations. Further, there has been another problem that the light use efficiency is degraded because thermal fluctuation of free electrons increases in the NF-light generator.

On the contrary, in the thermally-assisted magnetic recording according to the present invention, a surface plasmon mode is used, and NF-light 62 is generated by propagating surface plasmon 60 toward the head end surface 2210. This brings the temperature at the NF-light generating end surface 36a to, for example, about 100° C. during the emission of NF-light, the temperature being drastically reduced compared to the conventional. Thus, this reduction of temperature allows the protrusion of the NF-light generating end surface 36a toward the magnetic disk 10 to be suppressed; thereby favorable thermally-assisted magnetic recording can be achieved. The induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

FIGS. 7a1 to 7c show schematic views illustrating different embodiments of an optical system that generates NF-light and a main magnetic pole according to the present invention. FIGS. 7a1 and 7b1 are plan views illustrating arrangements of an element end surface on the head end surface 2210. FIGS. 7a2 and 7b2 are cross-sectional views taken by ZX-plane. FIG. 7c is a perspective view of a plasmon generator 78 and a main magnetic pole 79 depicted as being separated from each other.

Referring to FIGS. 7a1 and 7a2, a protrusion 75a of the main magnetic pole 75 is embedded in a groove formed in a plasmon generator 74. The main magnetic pole 75 is in contact with the plasmon generator 74 in such a manner that the main magnetic pole 75 is in surface-contact with a light penetration suppressing part 742 which forms inner walls of the groove. That is, the main magnetic pole 75 is separated from a plasmon propagating part 741 with the light penetration suppressing part 742 sandwiched therebetween. The plasmon generator 74 tapers down toward the head end surface 2210 in Z-axis direction such a manner that a propagation edge 740 slants upward.

Referring to FIGS. 7b1 and 7b2, a protrusion 77a of a main magnetic pole 77 is embedded in a groove formed in a plasmon generator 76. The main magnetic pole 77 is in contact with the plasmon generator 76 in such a manner that the main magnetic pole 77 is in surface-contact with a light penetration suppressing part 762 that forms the inner walls of the groove. That is, the main magnetic pole 77 is separated from a plasmon propagation part 761 with the light penetration suppressing part 762 sandwiched therebetween. The plasmon generator 76 tapers toward the head end surface 2210 in Z-axis direction in such a manner that the side opposite to a propagation edge 760 slants downward. Accordingly, a magnetic pole edge 77b of the protrusion 77a of the main magnetic pole 77 is slanted downward toward the head end surface 2210.

In the embodiments illustrated in FIGS. 7a1 and 7a2 and FIGS. 7b1 and 7b2, the provision of the light penetration suppressing part prevents significant reduction in the light use efficiency due to partial absorption of surface plasmon propagating along the propagation edge into the main magnetic pole. Furthermore, since the propagation edge or the magnetic pole edge is slanted so that the plasmon generator is sufficiently thinned at the head end surface 2210, the distance $D_{MW}$ between the part that is not embedded in the groove of the main magnetic pole and a waveguide 35 can be increased while the write field generating point WFP and the NF-light generating point NFP are placed sufficiently close to each other. This configuration avoids absorption of waveguide light into the main magnetic pole and therefore reduction in the amount of light converted to NF-light, while sufficiently increasing the magnetic field gradient of write field in a position on a magnetic recording medium that is irradiated with NF-light. Thus, good thermally-assisted magnetic recording with high recording density can be achieved.

Referring to FIG. 7c, the plasmon generator 78 includes a plasmon propagating part 781 and a light penetration suppressing part 782 that are overlapped to each other, and has the shape of a tray having a width in the track width direction (Y-axis direction) that tapers toward the head end surface 2210. A protrusion 79a of the main magnetic pole 79 is tightly fitted into the tray-shaped portion of the plasmon generator 78 without clearance. Accordingly, the main magnetic pole 79 is in contact with the plasmon generator 78 in such a manner that the main magnetic pole 79 is in surface-contact with the light penetration suppressing part 782 that forms the inner walls of the tray of the plasmon generator 78. In other words, the main magnetic pole 79 is separated from the plasmon propagating part 781 with the light penetration suppressing part 782 sandwiched therebetween.

The plasmon generator 78 further includes a propagation surface 780s and a propagation edge 780 on the side facing the waveguide. The propagation edge 780 is coupled to an end of the tapering propagation surface 780s and extends to the head end surface 2210. Excited surface plasmon 70 propagate on the propagation surface 780s toward the head end surface 2210, are concentrated on the propagation edge 780, and propagate along the propagation edge 780 to the NF-light generating point NFP. As a result, the electric field intensity of the surface plasmon that reaches the point NFP increases and near-filed light with a higher light density is emitted from the point NFP. Furthermore, as has been described above, the provision of the light penetration suppressing part 782 can avoid significant reduction in the light use efficiency due to partial absorption of surface plasmon 70 propagating along the propagation surface 780s and the propagation edge 780 into the main magnetic pole 79.

Practical Examples

Practical examples will be described below in which generation of NF-light in a NF-light generating optical system in a thermally-assisted magnetic recording head according to the present invention was analyzed in simulation.

Figure 8:
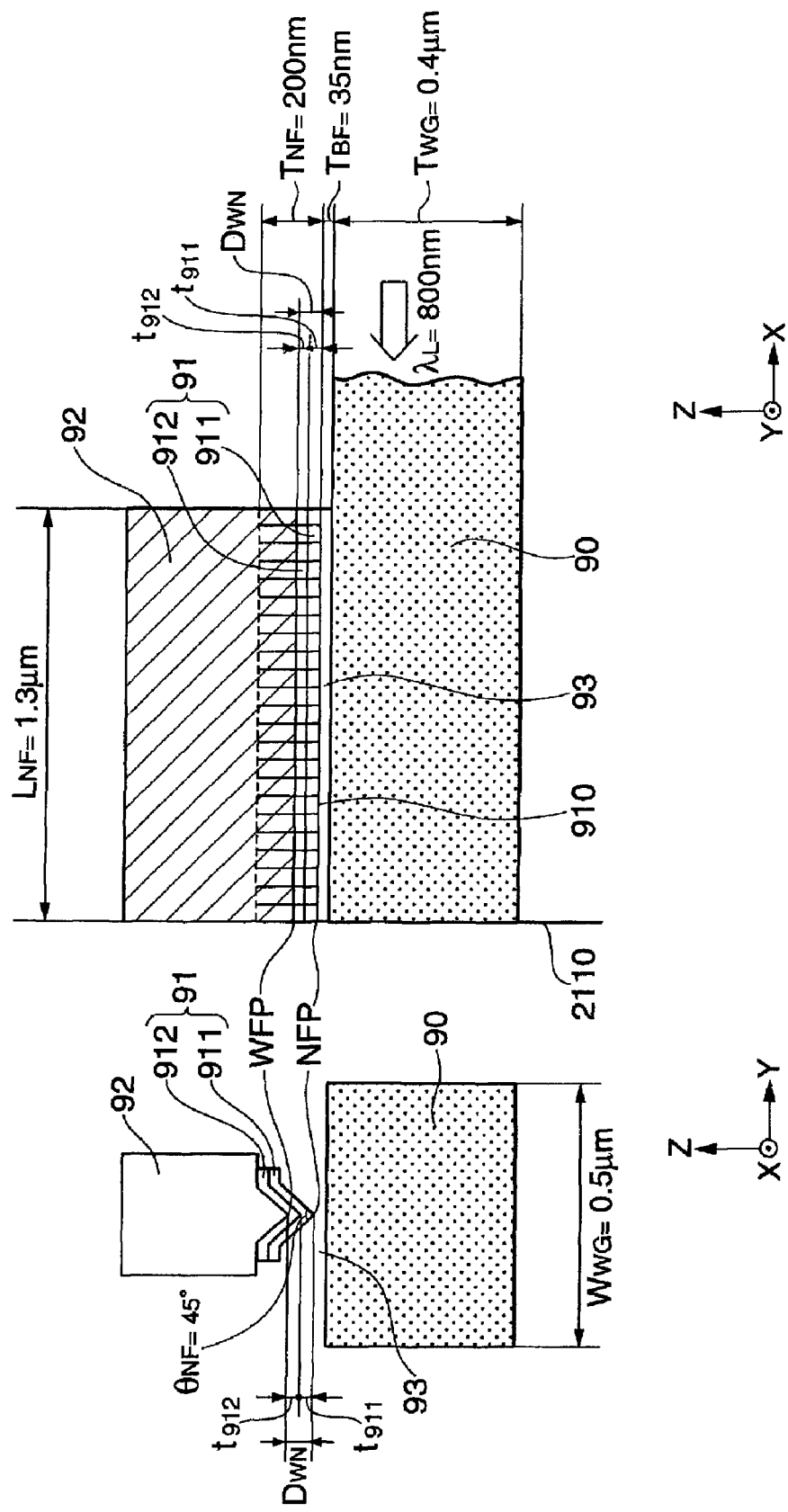
FIG. 8 shows a schematic diagram illustrating a system on which the analytical simulation experiment was conducted as practical examples.

The analytical simulation experiment was conducted by a three-dimensional Finite-Difference Time-Domain (FDTD) method, which is an electromagnetic field analysis technique. FIG. 8 shows a schematic diagram illustrating a system on which the analytical simulation experiment was conducted as the practical examples. As illustrated in FIG. 8, laser light incident on the waveguide 90 was a Gaussian beam with a wavelength $\lambda_L$ of 800 nm and transverse magnetic (TM) polarization (in which the electric field of the laser light oscillates in the direction perpendicular to the surface of the layers of the waveguide 90, namely in Z-axis direction). The intensity $I_{IN}$ of the laser light was 1.0 (V/m)$^2$.

The waveguide 90 had a width $W_{WG}$ of 0.5 μm and a thickness $T_{WG}$ of 0.4 μm and was made of TaO$_x$ (with a refractive index $n_{WG}$=2.15). A plasmon generator 91 had a height $T_{NF}$ of 200 nm and had a two-layered structure made up of a plasmon propagating part 911 and a light penetration suppressing part 912. The plasmon propagating part 911 was made of Au. The real part of the complex index of refraction of the Au was 0.22 and the imaginary part (extinction coefficient k) was 4.9. On the other hand, the light penetration suppressing part 912 was made of Al. The real part of the complex index of refraction of the Al was 2.7 and the imaginary part (extinction coefficient k) was 8.1. The vertex angle $\theta_{NF}$ at the near-filed light generating point NFP on the head end surface 2210 of the plasmon generator 91 was 45 degrees (°). The radius of curvature of the propagation edge 910 was 10 nm. The distance $T_{BF}$ between the near-filed light generating point NFP (the propagation edge 910) and the waveguide 90 was 35 nm. The main magnetic pole 92 was made of FeCo. The real part of the complex index of refraction of the FeCo was 3.08 and the imaginary part was 3.9.

The distance $D_{WN}$ between the NF-light generating point NFP of the plasmon generator 91 and the write field generating point WFP of the main magnetic pole 92 was 35 nm. The distance $D_{WN}$ was equivalent to the thickness of the plasmon generator 91 in Z-axis direction and was equal to (thickness $t_{911}$ of plasmon propagating part 911)+(thickness $t_{912}$ of light penetration suppressing part 912): $D_{WN}=t_{911}+t_{912}$. In the analytical simulation experiment, the distance $D_{WN}$ was maintained at a constant value (35 nm) while the thickness $t_{912}$ of the light penetration suppressing part 912 was varied among 0 nm, 5 nm, 10 nm, 15 nm, 20 nm, and 25 nm. Here, the case where $t_{912}$=0 represents a comparative example in which the light penetration suppressing part 912 was absent. Simulation was also conducted for a practical example where the distance D was 30 nm and the thickness $t_{912}$ of the light penetration suppressing part 912 was 5 nm.

A protective layer 93 which covers the waveguide 90, the plasmon generator 91 and the main magnetic pole 92 and includes a buffer portion was made of Al$_2$O$_3$ (alumina with a refractive index $n_{BF}$=1.65). The length $H_{NF}$ (in X-axis direction) of the plasmon generator 91 was 1.3 μm, which was the same as the length of the main magnetic pole 92.

Under the experimental conditions described above, the relationship between the thickness $t_{912}$ of the light penetration suppressing part 912 and the light density max|E|$^2$ of NF-light generated at the NF-light generating point NFP of the plasmon generator 91 was measured with the simulation. Here, the light density max|E|$^2$ is the maximum square of absolute value of an electric field component E in a spot of NF-light that was emitted from the NF-light generating point NFP and reached a magnetic recording medium at a distance of 6 nm from the vertex NFP in −X direction.

Figure 9:
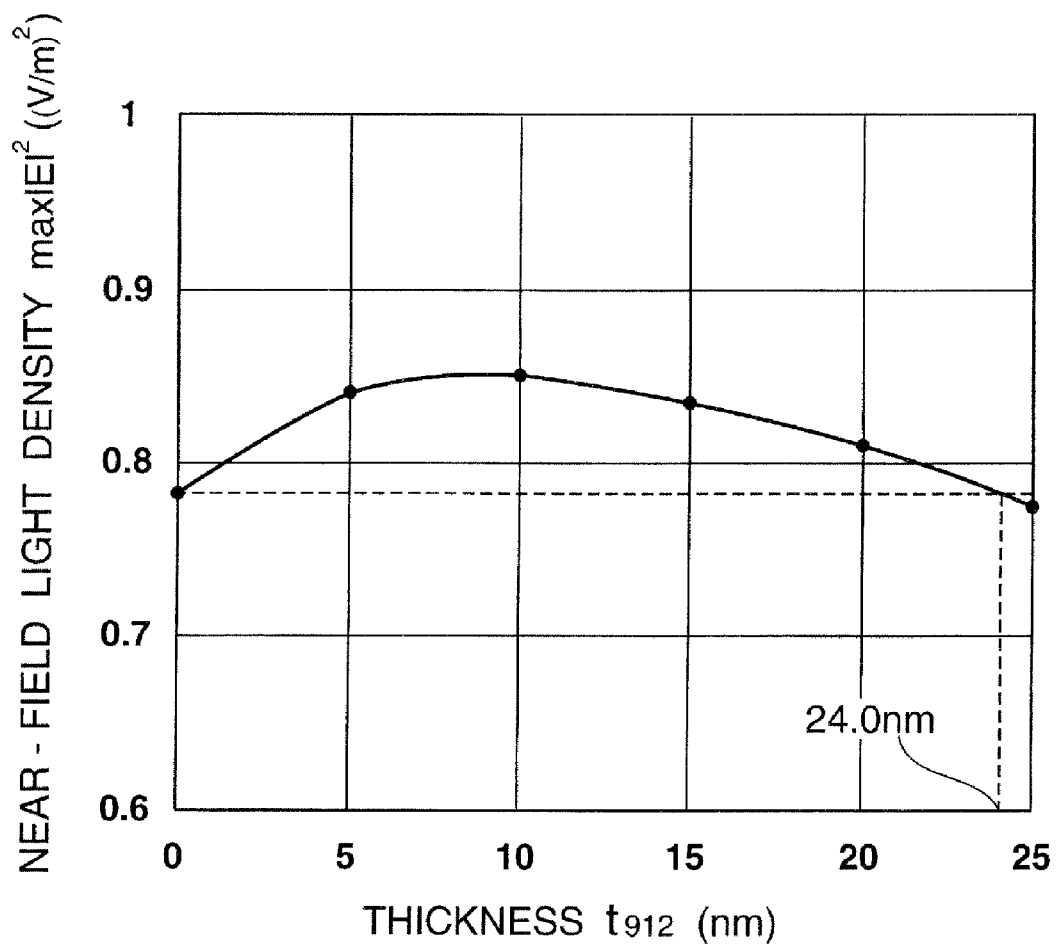
FIG. 9 shows a graph illustrating the relation between the thickness of the light penetration suppressing part and the light density max|E|$^2$ at a distance $D_{WN}$ of 35 nm.

Table 1 lists the measurements of the light density max|E|$^2$ in the simulation where the thickness $t_{912}$ of the light penetration suppressing part 912 was varied. FIG. 9 shows a graph of measurements in the simulation obtained at a distance $D_{WN}$ of 35 nm among the measurements listed in Table 1. The case where the thickness $t_{912}$ of the light penetration suppressing part 912 is 0 in Table 1 and FIG. 9 represents the comparative example in which the light penetration suppressing part 912 was absent (The entire plasmon generator 91 is made of Au.) to be compared with the present practical examples.

TABLE 1

| Distance $D_{WN}$ (nm) | Thickness $t_{911}$ (nm) | Thickness $t_{912}$ (nm) | Light density max |E|$^2$ ((V/m)$^2$) |
|---|---|---|---|
| 35 | 35 | 0 | 0.78 |
| 35 | 30 | 5 | 0.84 |
| 35 | 25 | 10 | 0.85 |
| 35 | 20 | 15 | 0.84 |
| 35 | 15 | 20 | 0.81 |
| 35 | 10 | 25 | 0.78 |
| 30 | 25 | 5 | 0.78 |

Referring to Table 1 and FIG. 9, when the distance $D_{WN}$ between the NF-light generating point NFP and the write field generating point WFP, that is, (thickness $t_{911}$ of plasmon propagating part 911)+(thickness $t_{912}$ of light penetration suppressing part 912), is 35 nm, the light density max|E|$^2$ of NF-light generated exhibits a broad peak in the range of thicknesses $t_{912}$ from 0 to 25 nm and takes on a maximum value of 0.85 (V/m)$^2$ at thickness $t_{912}$=10 nm. The maximum light density represents a gain of approximately 9% over the comparative example where thickness $t_{912}$=0. In the practical example in which the light density takes on the maximum value, the thickness of the light penetration suppressing part 912 (thickness $t_{912}$=10 nm) is sufficient to suppress absorption of the electric field (light) propagating from the plasmon propagating part 911 to the main magnetic pole 92 under the condition that the plasmon propagating part 911 (thickness $t_{911}$=25 nm) has a sufficient volume to provide a sufficiently high light density max|E|$^2$.

It can be seen from FIG. 9 that, when the thickness $t_{912}$ of the light penetration suppressing part 912 is finite and less than or equal to 24.0 nm, light densities max|E|$^2$ higher than or equal to the light density max|E|$^2$ in the comparative example where the thickness $t_{912}$=0 can be obtained. Experiments have shown that the light penetration suppressing part 912 needs to have a film thickness of at least 1 nm in order to be formed as a continuous film and to reliably suppress penetration of the electromagnetic field. Therefore, it will be understood that the thickness $t_{912}$ of the light penetration suppressing part 912 is preferably 1 nm or more and preferably 24 nm or less. It will also be understood that the thickness $t_{912}$ is more preferably 5 nm or more and is more preferably 20 nm or less, because a light density max |E|$^2$ that exceeds the light density in the comparative example can be reliably achieved in that range. The light penetration suppressing part 912 that has a thickness in these ranges effectively suppresses absorption of the electric field (light) propagating through the plasmon propagating part 911 into the main magnetic pole 92.

It will also be understood from the upper limits of the preferable ranges of the thickness $t_{912}$ that the thickness $t_{911}$ of the plasmon propagating part 911 is preferably at least 11 nm, more preferably at least 15 nm in the presence of the light penetration suppressing part 912.

It is known that the distance $D_{WN}$ (=thickness $t_{911}$+thickness $t_{912}$) between the NF-light generating point NFP and the write field generating point WFP is preferably 15 nm or more and preferably 100 nm or less, in order to provide a sufficiently large gradient of write field in a position on the magnetic recording layer of the magnetic disk 10 that is irradiated with NF-light to enable thermally-assisted magnetic recording with high recording density. Therefore, the thickness $t_{911}$ (=distance $D_{WN}$−hickness $t_{912}$) of the plasmon propagating part 911 is preferably 11 nm or more and preferably 99 nm or less, and more preferably in the range of 15 nm and 95 nm, inclusive.

The practical example in Table 1 in which the distance $D_{WN}$ (=thickness $t_{911}$+thickness $t_{912}$) is 30 nm, the thickness $t_{911}$ of the plasmon propagating part 911 is 25 nm and the thickness $t_{912}$ of the light penetration suppressing part 912 is 5 nm is compared with the comparative example where the thickness $t_{912}$=0 (distance $D_{WN}$=35 nm). In the practical example, the light density max$|E|^2$ (0.78) is exactly as high as that in the comparative example even through the distance $D_{WN}$ is 30 nm and the thickness of the plasmon generator 91 (distance $D_{WN}$) is 5 nm smaller than that in the comparative example. Thus, the use of the light penetration suppressing part 912 enables a thinner plasmon propagating part 911 to be used to achieve a smaller distance $D_{WN}$ while keeping the light density max$|E|^2$ high. This can contribute to higher recording densities in thermally-assisted magnetic recording.

Thus, according to the present invention, a plasmon generator including a light penetration suppressing part is used and a magnetic pole is placed in contact with the plasmon generator in such a manner that the magnetic pole is in surface-contact with the light penetration suppressing part, thereby avoiding significant reduction in the light use efficiency of an optical system generating NF-light due to partial absorption of electromagnetic field (light) propagating along the plasmon generator into the magnetic pole. Furthermore, according to the present invention, the write field generating point WFP of the magnetic pole and the NF-light generating point NFP of the plasmon generator can be located close to each other and NF-light with a sufficiently high light density can be applied to a magnetic recording medium. As a result, thermally-assisted magnetic recording with a higher recording density can be achieved.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
   a magnetic pole for generating write field from its end on an opposed-to-medium surface side;
   a waveguide through which a light for exciting surface plasmon propagates; and
   a plasmon generator provided between the magnetic pole and the waveguide, configured to be coupled with the light in a surface plasmon mode and to emit near-field light from a near-field light generating end surface positioned on the opposed-to-medium surface side,
   the plasmon generator comprising: a plasmon propagating part comprising a propagation edge extending to the near-field light generating end surface and configured to propagate thereon the surface plasmon excited by the light, at least a portion of the propagation edge being opposed to the waveguide with a predetermined distance; and a light penetration suppressing part formed of a material having an extinction coefficient greater than an extinction coefficient of a material that forms the plasmon propagating part,
   the light penetration suppressing part being in surface-contact with a surface portion of the plasmon propagating part, the surface portion excluding the propagation edge, and
   the magnetic pole being in surface-contact with the light penetration suppressing part.

2. The thermally-assisted magnetic recording head as claimed in claim 1, wherein the magnetic pole is separated from the plasmon propagating part with the light penetration suppressing part sandwiched therebetween.

3. The thermally-assisted magnetic recording head as claimed in claim 1, wherein the light penetration suppressing part covers a back surface of the plasmon propagating part, the back surface being on a side opposite to a propagation surface that includes the propagation edge.

4. The thermally-assisted magnetic recording head as claimed in claim 1, wherein the light penetration suppressing part is formed of a material selected from a group consisting of aluminum, magnesium, indium, and tin, or is formed of an alloy containing at least one element selected from the group.

5. The thermally-assisted magnetic recording head as claimed in claim 1, wherein: the magnetic pole comprises a protrusion that protrudes toward the waveguide; the plasmon propagating part covers at least a portion on the opposed-to-medium surface side of a magnetic pole edge, which is a protruding end of the protrusion, with the light penetration suppressing part sandwiched therebetween; and an end on the opposed-to-medium surface side of the magnetic pole edge, which is a write field generating location, is close to an end on the opposed-to-medium surface side of the propagation edge, which is a near-field light generating location.

6. The thermally-assisted magnetic recording head as claimed in claim 5, wherein a distance between the end on the opposed-to-medium surface side of the magnetic pole edge and the end on the opposed-to-medium surface side of the propagation edge is 15 nanometers or more, and 100 nanometers or less.

7. The thermally-assisted magnetic recording head as claimed in claim 1, wherein the light penetration suppressing part has a thickness of 1 nanometer or more and of 24 nanometers or less.

8. The thermally-assisted magnetic recording head as claimed in claim 1, wherein the plasmon propagating part has a thickness of 11 nanometers or more and of 99 nanometers or less.

9. The thermally-assisted magnetic recording head as claimed in claim 1, wherein a magnetic shield is provided on a side opposite to the magnetic pole when viewed from the plasmon generator.

10. The thermally-assisted magnetic recording head as claimed in claim 1, wherein a buffering portion having a refractive index lower than a refractive index of the waveguide is provided in a region including a portion sandwiched between the waveguide and the propagation edge.

11. A head gimbal assembly comprising: a thermally-assisted magnetic recording head as claimed in claim 1; and a suspension supporting the thermally-assisted magnetic recording head.

12. A magnetic recording apparatus comprising:
   at least one head gimbal assembly comprising: a thermally-assisted magnetic recording head; and a suspension supporting the thermally-assisted magnetic recording head;
   at least one magnetic recording medium; and
   a recording circuit configured to control write operations that the thermally-assisted magnetic recording head performs to the at least one magnetic recording medium,
   the thermally-assisted magnetic recording head comprising:
   a magnetic pole for generating write field from its end on an opposed-to-medium surface side;

a waveguide through which a light for exciting surface plasmon propagates; and a plasmon generator provided between the magnetic pole and the waveguide, configured to be coupled with the light in a surface plasmon mode and to emit near-field light from a near-field light generating end surface positioned on the opposed-to-medium surface side, the plasmon generator comprising: a plasmon propagating part comprising a propagation edge extending to the near-field light generating end surface and configured to propagate thereon the surface plasmon excited by the light, at least a portion of the propagation edge being opposed to the waveguide with a predetermined distance; and a light penetration suppressing part formed of a material having an extinction coefficient greater than an extinction coefficient of a material that forms the plasmon propagating part, the light penetration suppressing part being in surface-contact with a surface portion of the plasmon propagating part, the surface portion excluding the propagation edge, the magnetic pole being in surface-contact with the light penetration suppressing part, and the recording circuit further comprising a light-emission control circuit configured to control operations of a light source that generates the light for exciting surface plasmon.

13. The magnetic recording apparatus as claimed in claim 12, wherein the magnetic pole is separated from the plasmon propagating part with the light penetration suppressing part sandwiched therebetween.

14. The magnetic recording apparatus as claimed in claim 12, wherein the light penetration suppressing part covers a back surface of the plasmon propagating part, the back surface being on a side opposite to a propagation surface that includes the propagation edge.

15. The magnetic recording apparatus as claimed in claim 12, wherein the light penetration suppressing part is formed of a material selected from a group consisting of aluminum, magnesium, indium, and tin, or is formed of an alloy containing at least one element selected from the group.

16. The magnetic recording apparatus as claimed in claim 12, wherein: the magnetic pole comprises a protrusion that protrudes toward the waveguide; the plasmon propagating part covers at least a portion on the opposed-to-medium surface side of a magnetic pole edge, which is a protruding end of the protrusion, with the light penetration suppressing part sandwiched therebetween; and an end on the opposed-to-medium surface side of the magnetic pole edge, which is a write field generating location, is close to an end on the opposed-to-medium surface side of the propagation edge, which is a near-field light generating location.

17. The magnetic recording apparatus as claimed in claim 12, wherein a magnetic shield is provided on a side opposite to the magnetic pole when viewed from the plasmon generator.

18. The magnetic recording apparatus as claimed in claim 12, wherein a buffering portion having a refractive index lower than a refractive index of the waveguide is provided in a region including a portion sandwiched between the waveguide and the propagation edge.

* * * * *